(12) United States Patent
Almaasbak et al.

(10) Patent No.: US 7,985,340 B2
(45) Date of Patent: Jul. 26, 2011

(54) MAGNETIC SEPARATOR

(75) Inventors: Hilde Kjersti Almaasbak, Oslo (NO); Christer Johansson, Gothenburg (SE)

(73) Assignee: Invitrogen Dynal AS, Oslo (NO)

( * ) Notice: Subject to any disclaimer, the term of this patent is extended or adjusted under 35 U.S.C. 154(b) by 1074 days.

(21) Appl. No.: 11/566,183

(22) Filed: Dec. 1, 2006

(65) Prior Publication Data

US 2007/0175831 A1 Aug. 2, 2007

Related U.S. Application Data

(60) Provisional application No. 60/741,975, filed on Dec. 2, 2005.

(51) Int. Cl.
*G01N 33/537* (2006.01)
*C02F 1/48* (2006.01)
*B01D 35/06* (2006.01)
*B03C 1/02* (2006.01)

(52) U.S. Cl. ......... 210/695; 210/222; 436/526; 435/7.1; 435/7.21; 209/223.1

(58) Field of Classification Search .................. 210/222, 210/695; 436/526; 435/7.1, 7.21; 209/223.1
See application file for complete search history.

(56) References Cited

U.S. PATENT DOCUMENTS

| | | | |
|---|---|---|---|
| 4,710,472 A | 12/1987 | Saur et al. | |
| 4,738,773 A | 4/1988 | Müller-Ruchholtz et al. | |
| 4,910,148 A | 3/1990 | Sorensen et al. | |
| 5,770,461 A | 6/1998 | Sakazume et al. | |
| 6,143,577 A * | 11/2000 | Bisconte Sconte De Saint Julien | 210/222 |

FOREIGN PATENT DOCUMENTS

| | | |
|---|---|---|
| EP | 1 467 817 B1 | 10/2004 |
| WO | WO-90/04019 | 4/1990 |
| WO | WO-90/14891 | 12/1990 |
| WO | WO-91/11716 | 8/1991 |

OTHER PUBLICATIONS

International Search Report and Written Opinion in PCT/IB2006/054564, dated May 16, 2007.

* cited by examiner

*Primary Examiner* — David A Reifsnyder
(74) *Attorney, Agent, or Firm* — Life Technologies Corporation

(57) ABSTRACT

A magnetic separator unit for the selective separation of at least one component from a fluid mixture is described. The unit can include at least one mandrel-shaped magnet unit and tubing wrapped around it. Fluid containing magnetisable particles can be passed through the tubing to allow attraction of the particles to the magnet unit.

22 Claims, 5 Drawing Sheets ic Separator

CROSS REFERENCE TO RELATED APPLICATIONS

This application claim claims priority to U.S. Provisional Application No. 60/741,975, filed Dec. 2, 2005, the disclosure of which is incorporated by reference as if set forth fully herein.

FIELD OF THE INVENTION

Systems for separating components of a solution by using magnetisable particles are disclosed. Separation of targets in a solution which comprises targets and non-targets can be performed using magnetisable particles coated with a ligand which binds to the targets, the target-particle complexes then being magnetically separated from the remaining components of the solution by applying a magnetic field with a gradient. Targets can include viruses, prokaryotic cells, or eukaryotic cells.

BACKGROUND OF THE INVENTION

Magnetisable particles are well known. These particles may be used for all affinity separation processes where the targets and non-targets are similar in molecular weight so that techniques such as centrifugation cannot be used. Instead, the targets and non-targets are separated by making use of their different affinity properties. The targets and non-targets can be separated by identifying a ligand such as an antigen, antibody, protein, polysaccharide, etc. which binds to the targets but not to the non-targets. The magnetisable particles are coated with this ligand and added to the sample solution. The solution is then incubated for a period so that as many as possible of the magnetisable particles attach, via the ligand, to the targets. A magnetic field with a gradient is then applied to the solution to attract and thereby trap the magnetisable particles with the targets attached while the remainder of the solution with the non-targets is removed.

The size of the magnetisable particles and the coating applied to them may be varied depending on the application. Typically, the particles may be about 1-10 microns in diameter. In most applications, the magnetisable particles are supplied in a quantity several times the number of targets so that virtually all targets are bound by at least one magnetisable particle.

Various machines have been designed to perform the process of magnetic separation. For example, WO 90/14891 describes a separation device comprising a rack for tubes, with a magnet placed adjacent to each tube slot such that the tubes intersect the fields of force from the magnet. When tubes containing the liquid to be separated are placed in the rack, the magnet attracts the magnetisable particles (and the targets to which they are bound) to the side of the tube. The remaining non-targets can then be removed by a pipette.

When there is a greater quantity of the liquid which is to be separated, the liquid containing the target may be stored within a flexible container or an aseptic bag such as a disposable blood bag. To perform the magnetic separation of the liquid in the bag, the bag is usually laid flat on top of a planar magnet or set of magnets after incubation. The magnetisable particles (with the targets attached) are drawn down towards the magnet. The remaining liquid containing the non-targets can then be evacuated through an outlet tube attached to the bag, while the magnetisable particles and targets are held in place on the bag wall by the magnet. U.S. Pat. No. 4,910,148, WO 90/04019 and WO 91/11716 are all examples of such machines designed for use with cell suspensions.

Separation can be performed either positively or negatively. In positive separation processes, the magnetisable particles attach to the targets which are to be retained so that these desired targets are retained by the magnet. In negative separation processes, the magnetisable particles attach to the non-targets which are to be removed so that these non-targets are retained by the magnet, while the desired targets are withdrawn from the system. In positive separation processes, the desired targets which are retained are still attached to the magnetisable particles, so the magnetisable particles may need to be cleaned from the targets before further analysis. In negative separation processes, the desired targets are withdrawn from the system and are therefore free from magnetisable particles and are ready for further analysis if desired.

U.S. Pat. No. 4,710,472 describes a magnetic separator system where a tube through which the sample flows is held between two magnets or where a magnet is held next to the tube. However, there is not much surface area of contact between the narrow tube and the magnet and therefore separation of the magnetisable particles from the sample is inefficient.

For certain applications of magnetisable particles, such as use in medical treatments, the process and the machines for carrying out the cell isolation process must meet certain requirements set by the relevant authorities, such as the Food and Drug Administration (FDA) in the United States. One such requirement is that the number of magnetisable particles which the system fails to capture must be below a certain threshold. For example, the FDA requirement for medical applications is that there must be less than 100 magnetisable particles per 3 million cells infused into a human subject.

Although a single magnet system can capture most of the magnetisable particles from a cell solution, a proportion of the particles still escape, either through not being captured by the magnet in the first place or through becoming detached from the magnet by turbulence in the flow. Therefore in order to meet the regulatory requirements, systems tend to employ a further magnet downstream of the first. Solution which is evacuated from the area of the first magnet passes into a second area with a second magnet. This second magnet serves to capture the remaining particles which have escaped from or bypassed the first magnet. Systems having two magnetic capture units are generally easily capable of meeting the regulatory requirements, but if stricter requirements are to be met, more magnets downstream of the second magnet may be employed.

Each of the systems mentioned above (U.S. Pat. No. 4,910,148, WO 90/04019 and WO 91/11716) has a primary magnetic capture unit and a secondary magnetic capture unit downstream of the primary unit.

In U.S. Pat. No. 4,910,148 the cell suspension is mixed with the magnetisable particles in a disposable blood bag and incubated. The bag is then placed in the primary magnetic capture unit which comprises a holder above a planar magnet plate in which the bag is held. After the primary separation has taken place, the suspension is transferred to a second blood bag which is attached to the secondary magnetic capture unit which comprises a second planar magnet where the remaining magnetisable particles are trapped, leaving a purified solution.

In WO 90/04019 and WO 91/11716 a similar arrangement is described wherein the cell concentrate is mixed with the magnetisable particles in a first disposable container which is placed in the primary separation chamber with the primary planar magnet. The first container is connected via a tube to a second disposable container which is placed in the secondary separation chamber with the secondary planar magnet. The purified cell concentrate is obtained from the outlet of the second container, while the separated cells attached to the paramagnetic particles are held along the sides of the first and second containers adjacent to the first and second magnets.

In all of these systems, the primary magnetic separation unit tends to have a magnet which has a relatively large field reach, capable of attracting magnetisable particles from the whole width of the first bag. The secondary magnetic separation unit tends to have a magnet which has a smaller field reach, but provides a correspondingly stronger attractive force for retaining the particles. As the fluid is passed through the secondary separation unit, the width of the second bag is restricted so that the magnetisable particles are within the field reach of the second magnet.

A disadvantage of these systems is that the systems require the use of additional disposable containers or bags. For each system run on a two magnet system, at least two bags are used, plus the tubing required to feed the first container, transfer fluid from the first to the second container and extract fluid from the second container. As these bags and tubes must all be sterile and aseptically connected, this represents a significant expense to the end user. These bags must often be the proprietor's own brand bags to fit their particular machine and so may be relatively expensive.

Also the planar magnet assemblies are bulky and heavy, especially when the secondary separation unit is provided with an additional pressing means for restricting the width of the bag. These systems are also complicated and time consuming to set up.

SUMMARY OF THE INVENTION

In one aspect, the invention provides a magnetic separator unit for the selective separation of at least one component from a fluid mixture, wherein the selected at least one component comprises magnetisable particles, the magnetic separator unit comprising: a magnet unit for attracting the magnetisable particles, the magnet unit comprising at least one magnet and being in the form of a mandrel around which, in use, a tubing for fluid flow may be wound, so as to enable the magnet unit to attract the magnetisable particles in the fluid.

Such a magnetic separation unit provides a much more straightforward and easy to use set up. An outlet tubing of a reservoir or sample bag containing the sample to be separated may be wound around the mandrel. There is therefore no need for further unnecessary usage of disposable bags. It is also much less expensive for the end user as any standard tubing may be used. The tubing wound round the magnet is downstream of the sample reservoir and is preferably directly connected to it. The tubing may easily be removed from the magnet after the separation process.

DETAILED DESCRIPTION OF THE INVENTION

A magnetic separation unit according to the invention may thus be used by taking a reservoir or sample bag which contains the sample with targets and non-targets to be separated and connecting an outlet tubing to it. The outlet tubing can then be wound around the magnet unit of the invention as described above and the sample is passed through the tubing, next to the magnet unit, and therefore through the magnetic field of the magnet unit so that the magnetisable particles within the sample are attracted to the magnet unit and held within the tubing. In a preferred embodiment, a peristaltic pump is used to pump the sample through the tubing. A waste chamber may be attached to the other end of the tubing to collect the non-targets (or in the case of negative separation where the non-targets are bound to the magnetisable particles, the "waste" chamber collects the targets).

In some cases it may be desirable to wash the magnetisable particles. This may be done by pumping a suitable wash buffer through the tubing after the sample has gone through. Alternatively, the washing may be done by first removing the magnetic field which is trapping the magnetisable particles and flushing the magnetisable particles into a second reservoir containing a wash buffer. Then the magnetisable particles may be recaptured by reinstating the magnetic field and passing the washbuffer through the tubing a second time. Removing of the magnetic field can be done either by unwinding the tube from the magnet or, if the magnet is an electromagnet, by switching the power off.

The amount of tubing placed around or adjacent to the magnet unit can be varied according to the requirements for removal of the magnetisable particles. The more tubing that is placed adjacent to the magnet unit, the greater the surface area there is for magnetisable particle capture. This system also has the advantage that a large surface area for capture is provided, while at the same time providing a long flow path for the fluid. Keeping the magnetisable particles in close proximity to the magnet unit over a long flow path leaves much less chance of the particles escaping from the magnetic field, i.e. a much higher capture rate.

The magnet unit may comprise a plurality of magnets orientated parallel to the axis of the mandrel and angularly spaced around the mandrel. These magnets may be arranged around an inner cylindrical mild steel core in order to increase the magnetic field in the region of the tubing. The magnet unit may comprise a plurality of magnets attached together in a row. Preferably the magnets are orientated anti-parallel as this provides a stronger magnetic field for capture of the magnetisable particles. A non-magnetic material may be placed between the plurality of magnets. A non-magnetic housing (for instance non-magnetic stainless steel) is provided to cover the magnets. Winding the tubing around the surface of the magnet unit gives a long flow path (with respect to the dimensions of the magnet) along which the magnetisable particles must pass and where there are magnetic fields with gradients that yield magnetic forces on the particles and hold the particles to the magnet areas.

Preferably the magnets are permanent magnets and more preferably they are neodymium iron boron magnets.

The mandrel may be generally cylindrical. Such a cylinder may be of any cross sectional shape, such as square or hexagonal, but it is preferably circular. Sharp corners may undesirably cause the tubing to kink when it is wound around the magnet unit.

In one preferred embodiment, the magnet unit comprises several magnets attached together in a row thus forming an elongate cylindrical magnet. Preferably non-magnetic material is provided between these magnets. The advantage of an elongate cylindrical magnet unit is that a larger surface area can be provided for a relatively low volume/bulk of magnet. A long flow path and a high capture rate may be achieved easily with such an arrangement.

Preferably, the magnet unit is provided with at least one holder for holding the tubing adjacent to the magnet. Although the system works with the tubing just wound freely around the magnet, a holder helps to keep the tubing neatly arranged and in close proximity to the magnet. In one embodiment of the invention, the holder comprises a tubing clip at each end of the magnet. The tubing is wound around the magnet and then held tight by the clips at each end so that the tubing is held in close proximity to the magnet substantially throughout its length.

Preferably the at least one holder is arranged to hold the tubing at a plurality of regions along its length. More preferably the holder is arranged to clamp the tubing at a plurality of regions along its length. For example, the holder may hold or clamp each coil of the tubing as it is wound around the magnet unit.

The holder can be released after use so as to allow the tubing to be easily removed from the magnet unit.

In the preferred embodiments, the tubing clamp is magnetisable and attaches magnetically to the magnet unit. Making use of the magnetic properties of the separator is particularly useful as it negates the need for further attachment means such as bands or screws. It also allows greater flexibility in positioning the clamp on the magnet unit.

In a simple form, the clamp may be formed from a strip of magnetic or magnetisable material such as magnetic tape or magnetisable metallic tape placed over the tubing after the system has been set up. However, with very strong magnets, the attractive force on the clamp from the magnet can be enough to squash the tubing which hinders the fluid flow therethrough. Therefore, preferably the tubing clamp comprises at least one steel clamp for magnetically attaching to the magnet and a non-magnetic retaining portion attached to the clamp for holding the tubing around or adjacent to the magnet. With this arrangement, the clamp is attached directly to the magnet and the retaining portion extending from the clamp holds the tubing around or adjacent to the magnet. The retaining portion may be positioned a set distance from the magnet in order to accommodate the tubing. Alternatively, the retaining portion may have an adjustable height so as to accommodate a range of tube diameters. Preferably the retaining portion has a layer of light pressure material, e.g. soft rubber facing the magnet so as to accommodate a range of diameters and provide light pressure to the tubing to keep it in close contact with the magnet unit.

The magnet is typically quite strong. In a preferred embodiment, the magnet has a magnetic field strength of about 0.2 T to about 0.4 T, more preferably 0.25 T to about 0.35 T. As a result, the clamp can be difficult to remove if it is not provided with a means of gaining purchase on it. Therefore, preferably the tubing clamp is provided with a grip which provides leverage for removing the clamp from the secondary magnet.

The magnet may comprise a permanent magnet. In some situations it is advantageous to be able to switch the magnetic field on or off so as to attract or release the magnetisable particles from its field. Alternatively therefore the magnet may be an electromagnet. The strength and structure of the magnet may vary a great deal and may be chosen according to the particular applications of the system.

According to additional aspects, the invention provides a system for the selective separation of at least one component from a fluid mixture, wherein the selected at least one component comprises magnetisable particles, the system comprising: a primary magnetic separator comprising a primary magnet for attracting the magnetisable particles; and a secondary magnetic separator comprising a secondary magnet for attracting the magnetisable particles; wherein the magnet of the invention functions as a secondary magnet and is in the form of a mandrel around which, in use, a tubing for fluid flow downstream of the primary magnetic separator unit may be wound, so as to enable the secondary magnet to attract the magnetisable particles in the fluid.

This system provides a much more straightforward and easy to use set up. A primary magnetic separator unit is used for the initial separation of the magnetisable particles from the fluid mixture. This stage may typically still use a disposable blood bag on a planar magnet as in the known systems, but other separation systems would be equally viable. However, instead of connecting the outlet tubing from the primary magnetic separator to a second disposable blood bag on a second planar magnet, the outlet tubing itself may be wound around the secondary magnet. There is therefore no need for further unnecessary usage of disposable bags. It is also much less expensive for the end user as any standard tubing may be used. After use, the tubing can simply be removed from the magnet.

In the preferred embodiments, the outlet tubing wound around the secondary magnet is directly connected to the primary separator unit, in particular for example, to the flexible bag of the primary separator unit.

It will be appreciated that the preferred features described above in relation to the magnetic separation unit are all also applicable to the secondary magnet in the above system.

In the preferred embodiments of the invention, the system or separator unit comprises the outlet tubing. The internal diameter of the tubing is preferably chosen so that the magnet still provides a field strength at the outer edge of the tubing sufficient to attract and capture the magnetisable particles. The choice of diameter also depends on the composition and/or viscosity of the sample. In the preferred embodiments, the tubing is about 0.2 to 1 cm, most preferably about 0.5 cm in diameter.

The invention also provides a system comprising a separator unit as described above, the system further comprising a reservoir upstream of the separator unit for supplying fluid mixture thereto.

The fluid can generally be any type of fluid. Examples of fluid include blood, serum, and urine.

Another embodiment provides a magnetic separator unit for the selective separation of at least one component from a fluid mixture, wherein the at least one component comprises magnetisable particles, the magnetic separator unit comprising: a magnet for attracting the magnetisable particles, the magnet being in the form of a mandrel around which a tubing for fluid flow is wound, so as to enable the magnet to attract the magnetisable particles in the fluid.

The invention also provides a method for removal of a target from a fluid, the method comprising: contacting the fluid with at least one magnetisable particle that binds said particle; attracting the magnetisable particle to a magnet being in the form of a mandrel around which a tubing for fluid flow is wound, so as to enable the magnet to attract the magnetisable particle in the fluid; and separating from the magnetisable particle from the fluid, wherein the target is removed from the fluid.

When a sample containing targets and non-targets is separated by a system or separator as described above, a fluid is obtained which is substantially free of targets when positive separation is used or substantially free of non-targets when negative separation is used.

The invention as described above is suitable for many applications. For example it may be used for the isolation of target cells from e.g. blood bags. Alternatively, the system may be used for separating parasites, bacteria or viruses from water samples. Also the system may be used for separating contaminating microbes and/or viruses from an incubated food sample in broth.

The magnetisable particles are preferably paramagnetic and more preferably superparamagnetic.

DESCRIPTION OF THE FIGURES

Certain preferred embodiments of the invention will now be described by way of example only and with reference to the accompanying drawings in which:

FIG. 1 shows a prior art system 1 with a first disposable bag 2 laid flat on a primary planar magnet 3. The outlet of the first disposable bag 2 is connected to an outlet tube 4 which is in turn connected to the inlet of a second disposable bag 5. The second disposable bag is laid flat on a secondary planar magnet 6. The outlet of the second disposable bag 5 is connected to a second outlet tube 7 which leads to a storage container or further processing or analysis equipment via its downstream outlet 17.

Figure 1:
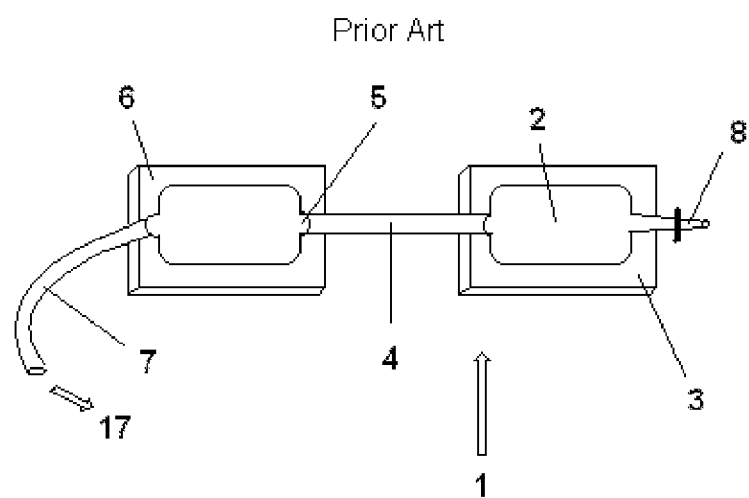
FIG. 1 is a diagram of a prior art two stage magnetic separation system.

The system of FIG. 1 can be used as follows. The cell suspension which is to be separated is fed into the first disposable bag 2 through an inlet 8 (shown sealed shut in the figures). The magnetisable particles can either be fed in at the same time as the cell suspension or they can be contained in a frangible container inside the bag which is broken just before incubation starts. The cell suspension and the magnetisable particles are incubated for a period of time in order to maximise the number of magnetisable particles which bind to the target cells. Once the incubation has taken place, the first disposable bag 2 is placed on the primary magnet 3 so that the magnetisable particles are drawn towards the side of the bag closest to the magnet 3. The remains of the cell suspension are then directed (often pumped) through the tubing 4 attached to the outlet of bag 2 and into the second disposable bag 5 which is already laid out on top of secondary planar magnet 6. Here, any magnetisable particles which escaped or bypassed the primary magnet 3 are caught by the secondary magnet 6 before the remains of the cell suspension leave the system via outlet 17 formed at the downstream end of second outlet tube 7 which may lead to a storage container or to further processing or analysis equipment. The system is arranged so that the number of magnetisable particles which do not get trapped by either the primary or the secondary magnets, i.e. the number remaining in the suspension at outlet 17 is below the required level, e.g. below a regulatory requirement level.

Figure 2:
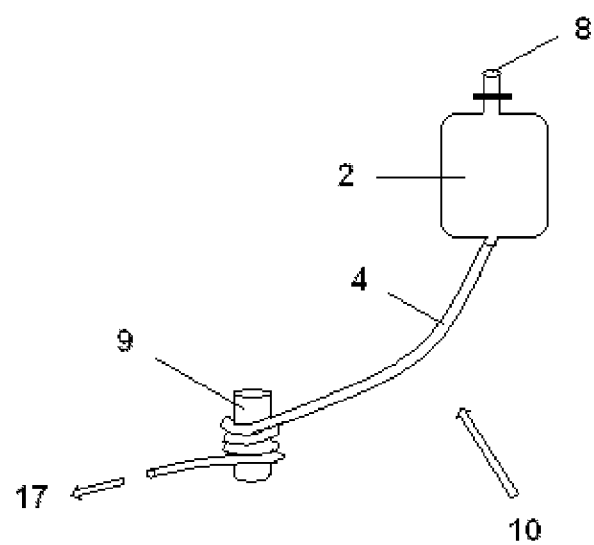
FIG. 2 is a diagram of a first embodiment of the invention.

FIG. 2 shows a first embodiment of the invention. The system 10 comprises a first disposable bag 2 connected to an outlet tube 4 (which is typically around 0.5 cm in internal diameter). However instead of connecting the outlet tube 4 to a second disposable bag, the outlet tube 4 is removably wound directly around the cylindrical magnet 9 thus bringing the magnetisable particles close to the magnet over a long flow path. The system outlet 17 is formed at the downstream end of outlet tube 4. It can immediately be seen that this system is considerably improved over the system of FIG. 1 as it uses a single disposable bag and a single length of tubing rather than two disposable bags and two lengths of tubing required by the system described in FIG. 1. After the separation process, the tubing 4 can easily be removed (unwound) from the magnet 9 for further processing or disposal.

Figure 3:
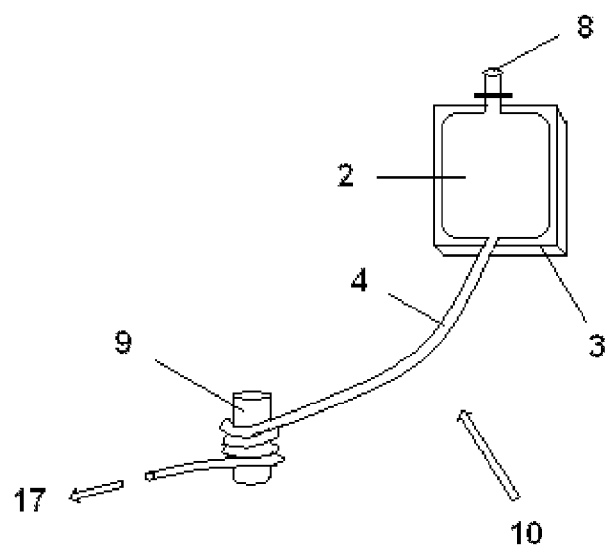
FIG. 3 is a diagram of a second embodiment of the invention.

FIG. 3 shows a second embodiment of the invention. The system 10 comprises a first disposable bag 2, planar magnet 3, inlet tube 8 and outlet tube 4 as described above in relation to the system of FIG. 1. However instead of connecting the outlet tube 4 to a second disposable bag, the outlet tube 4 is wound directly around the cylindrical secondary magnet 9 thus bringing the magnetisable particles close to the secondary magnet over a long flow path. The system outlet 17 is formed at the downstream end of outlet tube 4. It can immediately be seen that this system is a considerable improvement to that of FIG. 1 as it uses a single disposable bag and a single length of tubing rather than two disposable bags and two lengths of tubing required by the FIG. 1 system. After the separation process, the tubing 4 can easily be removed (unwound) from the magnet 9 for further processing or disposal.

Figure 4:
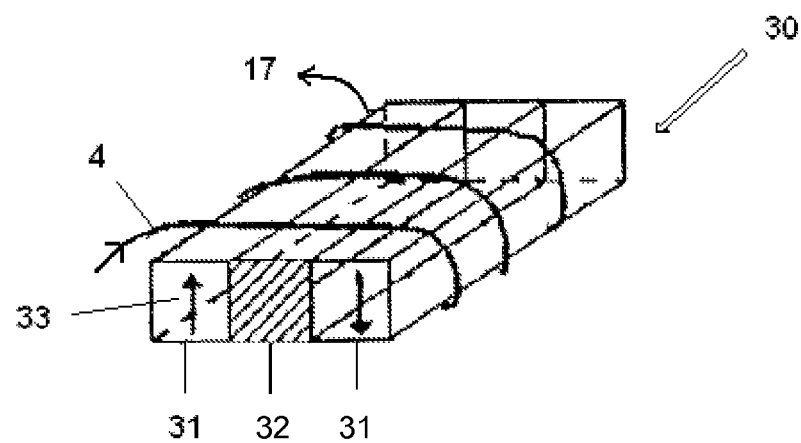
FIG. 4 is a diagram of a third embodiment of the invention.

FIG. 4 shows a third embodiment of the invention. The primary magnetic separation unit is the same as described in relation to FIG. 2. In this embodiment, the secondary magnet is an elongate cylindrical magnet 30. The elongate cylindrical magnet 30 is formed from a number of magnets 31, separated from each other by non-magnetic material 32. The magnetic orientations (shown by arrow 33) of the magnets 31 are aligned so that the magnetic fields of neighbouring magnets are anti-parallel.

Figure 5:
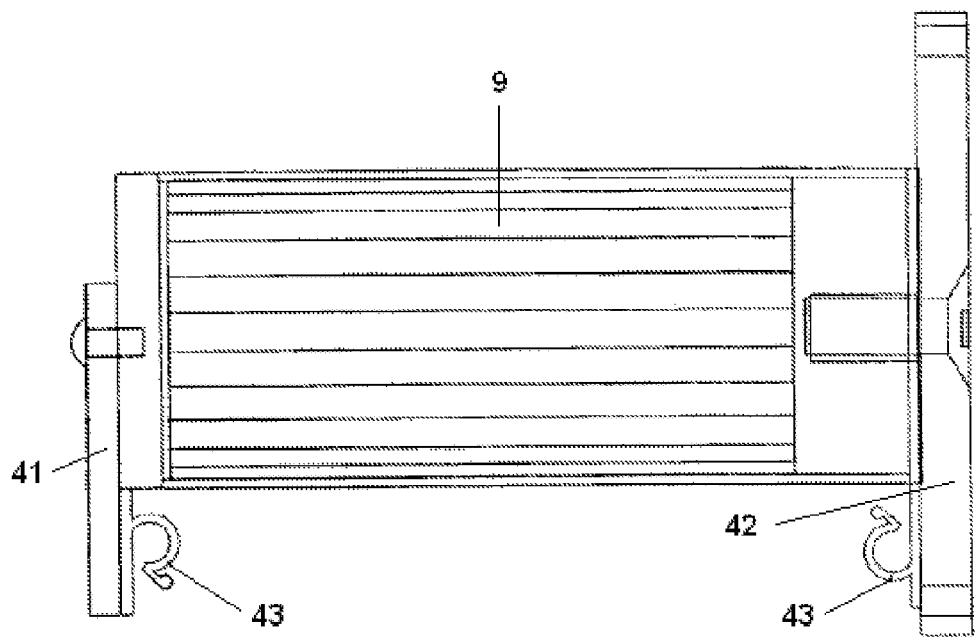
FIG. 5 is a side view of a fourth embodiment of the invention.

FIG. 5 shows a side view of a fourth embodiment of the invention which also uses a generally cylindrical magnet 9 as in the first embodiment. The magnet 9 is provided with top and bottom plates 41, 42 on the ends of the cylinder. Each plate 41, 42 is provided with a tube clip 43 for securing the tubing 4 (not shown) around the magnet 9 during use. The spool shape formed by the top and bottom plates 41, 42 and the magnet 9, acts in the same way as, for example, a cotton reel to prevent the tubing 4 from slipping off the end of the cylindrical magnet 9. The tubing 4 can easily be unclipped and removed for further processing or disposal after the separation process.

Figure 6:
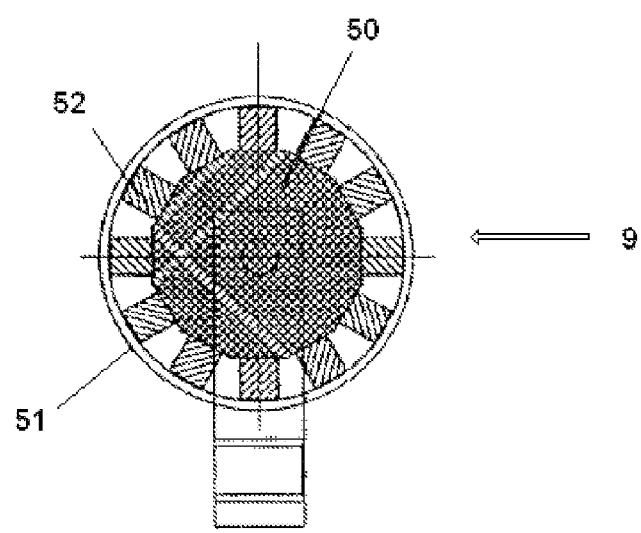
FIG. 6 is an end view of the fourth embodiment of the invention.

FIG. 6 shows an end view of the fourth embodiment of the invention. The cross section of the magnet 9 can be seen here. The secondary magnet 9 has a soft magnetic steel inner core 50 in order to increase the magnetic field in the region of the tubing. The outer surface of the magnet 9 is a thin shell 51 of a non-magnetic material such as non-magnetic stainless steel. Between the inner core 50 and the outer shell 51, twelve neodymium iron boron permanent magnets 52 are arranged, equally spaced around the periphery of the core 50. These magnets are arranged with their axes parallel to the axis of the cylinder, but with their magnetisation directions orientated anti-parallel to each other. That is, each magnet has its magnetisation orientation anti-parallel with that of its neighbours. The top plate 41 is provided with a clamp 43 for holding the tubing 4 in place at the top and base plate 42 is also provided with a clamp 43 for holding the tubing 4 in place at the bottom.

This structure could also be used for the magnets 31 in the elongate cylindrical magnet 30 used in the third embodiment of the invention.

The embodiments described above may be used as a separation system in their own right or they may be used as a secondary separation unit downstream of a primary magnetic separation unit. The primary magnetic separation unit may be a disposable bag placed on a planar magnet as in the known systems, however it will be understood that any alternative primary magnetic separation arrangement may be used instead.

Figure 7:
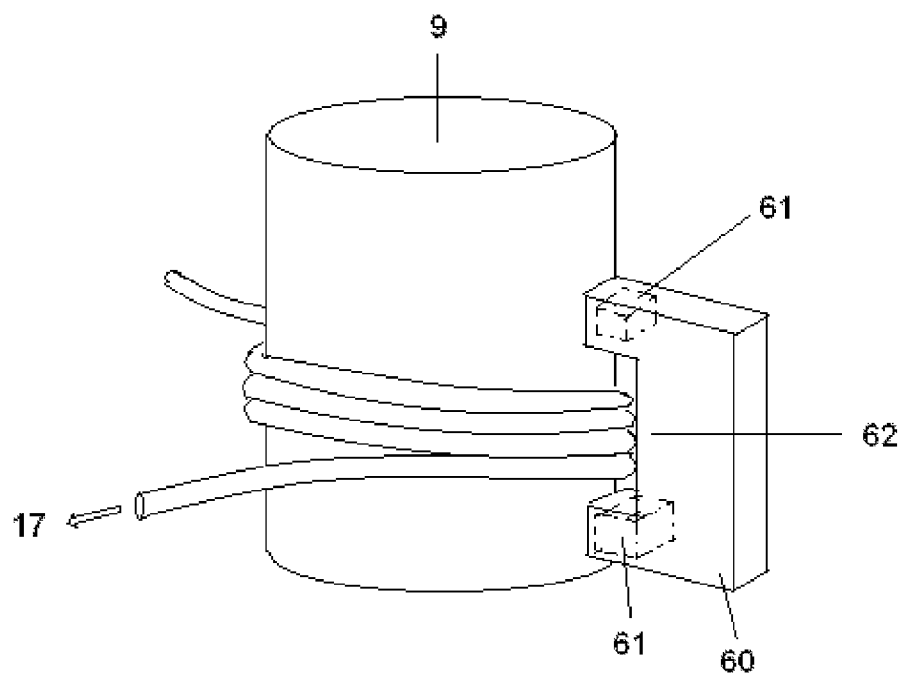
FIG. 7 shows a first embodiment of a holder for use with a magnet according to the invention.

FIG. 7 shows a magnetic holder 60 which can be used with any of the embodiments of the invention for holding the outlet tubing 4 neatly against the magnet 9, 30. The holder 60 is shown here in use against a cylindrical magnet 9. The holder 60 comprises two magnetisable attachment portions 61 which magnetically attach the holder to the magnet 9. These attachment portions 61 may be small iron or steel bars. The attachment portions 61 are encased within a plastics retaining portion 62 which is spaced from the magnet 9 by an amount equal to approximately the diameter of the tubing 4. In use, after the tubing 4 has been wound around the magnet 9, the holder 60 is placed over the coils of tubing so that the retaining portion 62 holds them firmly against the magnet 9. The coils are held between the two attachment portions 61 and may be supported by the lower attachment portion 61.

Figure 8:
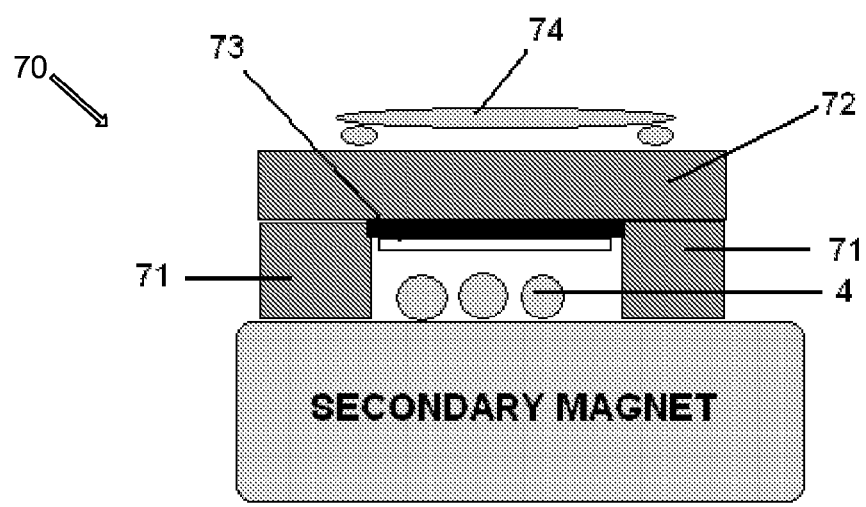
FIG. 8 shows a second embodiment of a holder for use with a magnet according to the invention.

FIG. 8 shows another embodiment of a holder 70 which can be used with any of the embodiments of the invention. The holder 70 comprises two attachment portions (small magnetisable steel or iron bars) 71 to fix the holder 70 to the magnet 9, 30. The attachment portions 71 are attached to a plastics (or other non-magnetic material) base 72 which holds the tubing 4 against the magnet 9, 30. On the inside of the base 72 (i.e. between the base 72 and the magnet 9, 30), there is a layer of soft rubber 73 (or an equivalent material) to apply light pressure on the tubing 4 to keep it in close contact with the surface of the magnet 9, 30. A grip 74 is also provided on the outside of the base 72 to aid removal of the holder 70 from the magnet 9, 30 by providing a handle where the user can get purchase on the holder 70. After the separation process, the holder 60 or 70 can be removed so that the tubing 4 can easily be removed from the magnet 9, 30 for further processing or disposal.

Figure 9:
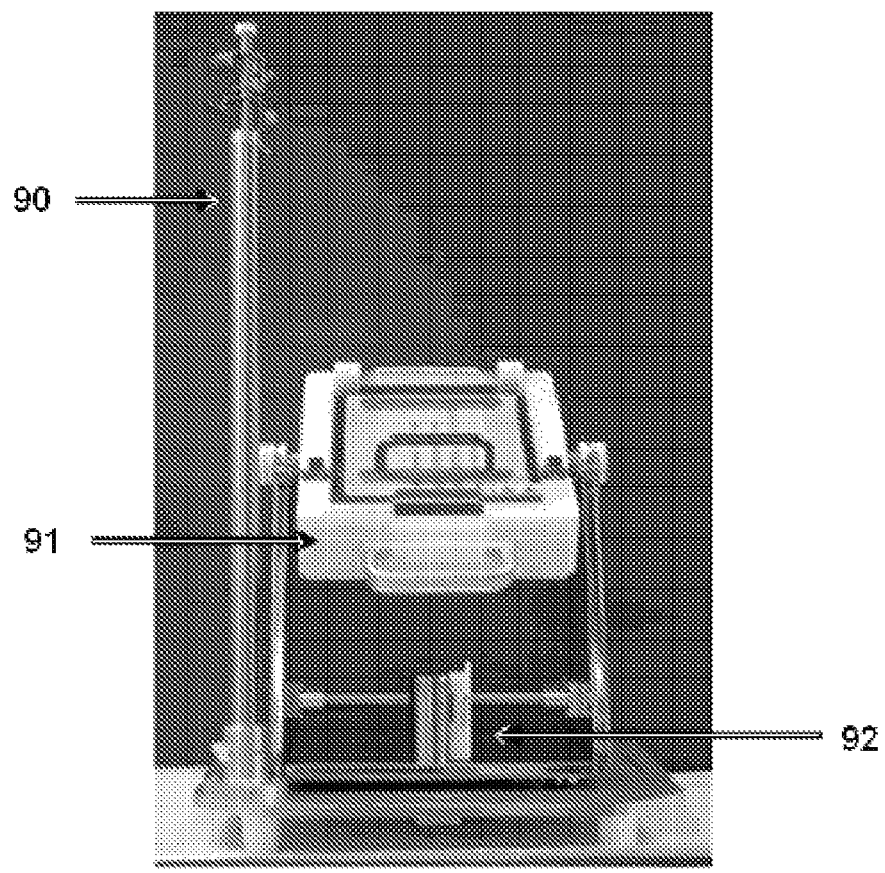
FIG. 9 shows a preferred separator unit of the present invention.

FIG. 9 shows a preferred separator unit. The fluid pole 90 runs alongside the detachable primary magnet 91, which can rotate 180° to allow for optimization of the capture process, reducing trapping of unwanted bioparticles. The primary magnet 91 is directly above the secondary magnet 92, which catches and retains residual magnetic beads that might escape initial magnetic capture from the primary magnet 91. The unit in FIG. 9 is particularly suited for use with sterile blood bags and tubing systems for medium to large-scale cell separation. In a preferred embodiment the unit permits scalable fluid volumes of 50 to 330 ml in static separations and >10 L in continuous flow separations following T cell expansion protocols.

The unit in FIG. 9 has been used to positively isolate bead-bound cells for subsequent stimulation/expansion of T cells and for removal of the beads following the expansion. Additionally, the unit has been used to deplete unwanted cell types by discarding the magnetic captured bead-bound cells, e.g. depletion of monocytes after phagocytosis.

The invention claimed is:

1. A magnetic separator for separating particles from a fluid mixture, the magnetic separator comprising:
    a magnet unit comprising:
        a magnetic inner core elongated along a first axis, the magnetic inner core comprising a first magnetic material; and
        a plurality of magnetic portions angularly spaced around the magnetic inner core, each of the magnetic portions being elongated along an axis parallel to the first axis and comprising a second magnetic material; and
    tubing wound around the magnet unit.

2. The magnetic separator of claim 1, wherein the magnetic inner core has a substantially circular cross-section.

3. The magnetic separator of claim 1, wherein the first magnetic material is soft magnetic steel.

4. The magnetic separator of claim 1, wherein the second magnetic material is different from the first magnetic material.

5. The magnetic separator of claim 1, wherein the magnetic portions are arranged such that any two neighboring magnetic portions have magnetic orientations that are anti-parallel to one another.

6. The magnetic separator of claim 1, wherein no magnetic material is present around the magnetic inner core between any two neighboring magnetic portions.

7. The magnetic separator of claim 1, further comprising an outer shell arranged around the magnetic portions, the outer shell comprising non-magnetic stainless steel.

8. The magnetic separator of claim 1, wherein at least one of the magnetic portions comprises a permanent magnet.

9. The magnetic separator of claim 1, wherein at least one of the magnetic portions comprises a neodymium iron boron magnet.

10. The magnetic separator of claim 1, wherein at least one of the magnetic portions comprises an electromagnet.

11. The magnetic separator of claim 1, further comprising at least one holder for holding the tubing adjacent to the magnet unit.

12. The magnetic separator of claim 11, wherein the at least one holder is arranged to hold the tubing at a plurality of regions along the length of the tubing.

13. The magnetic separator of claim 11, wherein the at least one holder comprises a clamp arranged to engage the tubing at a plurality of regions along the length of the tubing.

14. The magnetic separator of claim 11, wherein the at least one holder is configured to be magnetically attached to the magnet unit.

15. The magnetic separator of claim 14, wherein the at least one holder has a non-magnetic retaining portion for engaging the tubing.

16. The magnetic separator of claim 11, wherein at the least one holder is provided with a grip configured to provide leverage for removing the holder from the magnet unit.

17. The magnetic separator of claim 11, wherein the at least one holder is separable from the magnet unit.

18. The magnetic separator of claim 1, further comprising a reservoir for the fluid mixture.

19. The magnetic separator of claim 18, wherein the reservoir contains a fluid mixture including blood, serum, or urine.

20. A system for separating magnetisable particles from a fluid mixture, the system comprising:
    a primary magnetic separator comprising a primary magnet for attracting the magnetisable particles; and
    a secondary magnetic separator comprising a secondary magnet unit for attracting the magnetisable particles, the secondary magnet unit comprising a magnetic inner core elongated along a first axis and a plurality of magnetic portions angularly spaced around the magnetic inner core, each of the magnetic portions being elongated along an axis parallel to the first axis.

21. A method for removing a target from a fluid, the method comprising:
    contacting a fluid with at least one magnetisable particle that binds the target;
    attracting the magnetisable particle to a magnet unit around which a tubing for fluid flow is wound, the magnet unit including a magnetic inner core elongated along a first axis and a plurality of magnetic portions angularly spaced around the magnetic inner core, each of the magnetic portions being elongated along an axis parallel to the first axis; and separating the magnetisable particle from the fluid to remove the target from the fluid.

22. The method of claim 21, wherein the fluid is blood, serum, or urine.

* * * * *